(12) United States Patent
Karamanolis et al.

(10) Patent No.: US 6,687,701 B2
(45) Date of Patent: Feb. 3, 2004

(54) NAMESPACE MANAGEMENT IN A DISTRIBUTED FILE SYSTEM

(75) Inventors: Christos Karamanolis, Sunnyvale, CA (US); Zheng Zhang, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 09/962,865

(22) Filed: Sep. 25, 2001

(65) Prior Publication Data

US 2003/0131020 A1 Jul. 10, 2003

(51) Int. Cl.[7] .............................................. G06F 17/30
(52) U.S. Cl. ...................................................... 707/10
(58) Field of Search .............................. 707/1, 10, 101, 707/200, 206; 370/352; 379/201.03; 703/27; 709/203, 330; 713/100, 175; 715/513

(56) References Cited

U.S. PATENT DOCUMENTS

| | | | | |
|---|---|---|---|---|
| 5,617,568 A | * | 4/1997 | Ault et al. | 707/101 |
| 5,689,701 A | * | 11/1997 | Ault et al. | 707/10 |
| 6,502,109 B1 | * | 12/2002 | Aravamudan et al. | 707/206 |
| 6,567,398 B1 | * | 5/2003 | Aravamudan et al. | 370/352 |

FOREIGN PATENT DOCUMENTS

EP 1246061 A2 * 10/2002 ............ G06F/11/00

OTHER PUBLICATIONS

Anderson, D., Chase, J., and Vadhat, A. "Interposed Request Routing for Scalable Network Storage", in *Proc. of the 4th USENIX Windows Systems Symposium*. San Diego, CA, Aug. 2000.

Howard, J., et al., *Scale and Performance in a Distributed File System*. ACM Transactions on Computer Systems, vol. 6(1): pp. 51–81, 1988.

Ji, M. Felten, E.W., Wang, R., and Singh, J.P., "Archipelago: An Island–Based File System for Highly Available and Scalable Internet Services", in *Proc. of the 4th USENIX Windows Systems Symposium*, San Diego, CA, Aug. 2000.

*NFSVersion4 Technical Brief*, Sun Microsystems, Oct. 1999.

* cited by examiner

*Primary Examiner*—Diane D. Mizrahi
*Assistant Examiner*—Apu M Mofiz

(57) ABSTRACT

Method and system for performing a namespace operation in a distributed file system. The file system is disposed on a plurality of partition servers, and each partition server controls access to a subset of hierarchically-related, shared storage objects. Each namespace operation involves a namespace object and a target object that are part of the shared storage objects. Namespace operations received at each partition server are serialized. In response to an unlink namespace operation, a reference in the namespace object to the target object is removed, and after removal the target object is modified in accordance with the unlink operation. In response to a link operation, the target object is modified consistent with the link operation. After modification of the target object, a reference to the target object is inserted in the namespace object. A log record is stored in association with each namespace operation when the operation is started, and a log record is deleted upon completion of the associated operation.

10 Claims, 5 Drawing Sheets

NAMESPACE MANAGEMENT IN A DISTRIBUTED FILE SYSTEM

RELATED APPLICATION/PATENT

This application/patent is related to the application/patent entitled, "Namespace Management in a Distributed File System," by Karamanolis et al., filed on the same date as this application/patent, and having U.S. patent application Ser. No. 09/962,512.

FIELD OF THE INVENTION

The present invention generally relates to distributed file systems, and more particularly to management of a namespace in a distributed file system.

BACKGROUND

A partition-based approach to achieve high scalability for access to distributed storage services is currently being explored. The partition-based approach addresses the inherent scalability problems of cluster file systems, which are due to contention for the globally shared resources. In a partition-based approach, the resources of the system are divided into partitions, with each partition stored on a different partition server. Shared access is controlled on a per-partition basis.

All implementations of partition-based distributed storage services must maintain namespaces, which generally are distributed and reference objects that reside in multiple partitions. A namespace provides a mapping between names and physical objects in the system (e.g., files). A user usually refers to an object by a textual name. The textual name is mapped to a lower-level reference that identifies the actual object, including a location and object identifier. The namespace is implemented by means of directories, which are persistent files of <name, reference> pairs.

The requirement for consistency of the namespace can be formalized in terms of four properties:

1. One name is mapped to exactly one object.
2. One object may be referenced by one or more names.
3. If there exists a name that references an object, then that object exists.
4. If an object exists, then there is at least one name in the namespace that references the object.

Changes to the global namespace take the form of one of two classes of operations: link operations that insert a reference to an object, for example, a newly created object; and unlink operations that remove a reference to an object. Any of the above operations potentially spans more than one server in a distributed system. The server containing the directory (or "namespace object") and the server containing the referenced object may be physically separated.

Some systems presently use 2-phase commit to implement distributed namespace operations. However, to provide recoverability in the event of system failure during a namespace operation, atomic commitment protocols perform synchronous logging in the critical path of the operations, thereby incurring considerable overhead.

In addition to the overhead, atomic commitment protocols lock system resources across all the sites involved in an operation for the duration of the multi-phase commit, thereby increasing contention for resources such as free block lists and block allocation maps. Atomic commitment protocols also follow a conservative approach for recovery from failure: in the presence of failure, incomplete operations are typically aborted rather than attempting to complete the operation.

A system and method that address the aforementioned problems, as well as other related problems, are therefore desirable.

SUMMARY OF THE INVENTION

In various embodiments, the present invention performs namespace operations in a distributed file system. The file system is disposed on a plurality of partition servers, and each partition server controls access to a subset of hierarchically-related, shared storage objects. Each namespace operation involves a namespace object and a target object that are part of the shared storage objects. Namespace operations received at each partition server are serialized. In response to an unlink namespace operation, a reference in the namespace object to the target object is removed, and after removal the target object is modified in accordance with the unlink operation. In response to a link operation, the target object is modified consistent with the link operation. After modification of the target object, a reference to the target object is inserted in the namespace object. A log record is stored in association with each namespace operation when the operation is started, and a log record is deleted upon completion of the associated operation.

Various example embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the present invention provides a set of protocols for implementing the two main classes of operations (link and unlink) performed in distributed namespaces. The protocol minimizes the runtime overhead incurred in support of recoverability from host and communications failures by reducing the number of synchronous input/output operations in the critical path of the operation. In addition, the protocols avoid locking distributed resources by serializing operations at each partition server. In most failure scenarios, the protocols use aggressive recovery techniques to replay incomplete operations. Overall, the invention reduces communications overhead, reduces synchronous I/O and increases operation concurrency.

As described above, the two main classes of namespace operations are link and unlink. Other namespace operations can be either reduced to or composed by these two primitives. Table 1 below illustrates mappings of example file service operations to the associated namespace operations.

TABLE 1

| File Service operation | Namespace primitive(s) |
|---|---|
| create/mkdir | obtain a new object + link |
| remove/rmdir/unlink | unlink |
| rename | link (to_dir) + unlink(from_dir) |

Figure 1:
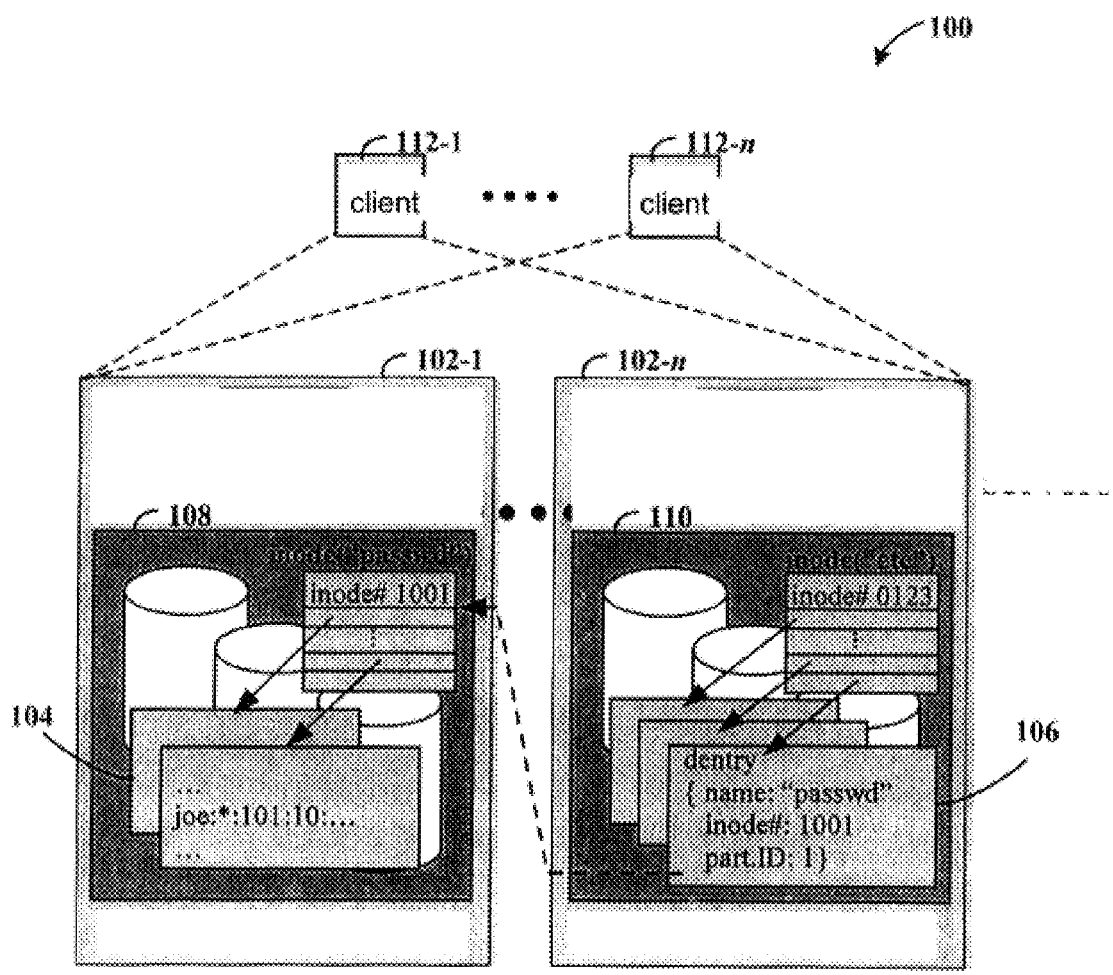
FIG. 1 is a functional block diagram of an example distributed file system that is implemented with partition servers.

FIG. 1 is a functional block diagram of an example distributed file system 100 implemented with partition servers 102-1–102-n. File system objects, such as files 104 and directories 106, are stored in different partitions 108 and 110, respectively, which may be geographically distributed depending on system requirements. Each partition is controlled by one partition server, which coordinates operations that may affect the state of the resources it owns, for example allocating or de-allocating blocks in response to requests from clients 112-1–112-m. Objects may be migrated and/or replicated according to locality of access, type of content, reliability and numerous other parameters.

The namespace in distributed file system 100 is implemented using directories, which are placed in one or more partitions, depending on system requirements. A directory may be placed in a different partition server from the children (subdirectories or files) of the directory. For example, a file with inode number 1001, which resides in partition 108, is referenced with the name "passwd" from a directory in partition 110.

Figure 2:
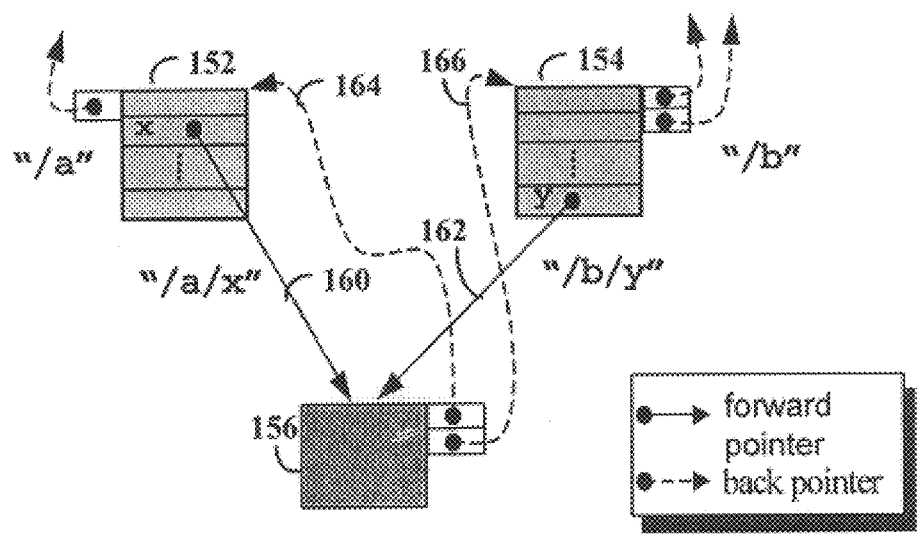
FIG. 2 is a block diagram that illustrates links from example namespace objects to an example target object and links from the target objects back to the namespace object.

FIG. 2 is a block diagram that illustrates links from example namespace objects to an example target object and links from the target object back to the namespace objects. Namespace objects 152 and 154 correspond, for example, to the directory entries 106 in FIG. 1, and target object 156 corresponds to a file 104. It will be appreciated that a target object could alternatively be a sub-directory.

In traditional file systems, objects are assigned a link-count. The link-count is an integer that represents the number of references (forward pointers) to the object in the namespace. In the present invention, back-pointers are used instead of a link-count. A back-pointer refers back to the parent namespace object. For example, namespace objects 152 and 154 reference target object 156 with forward-pointers 160 and 162. Target object 156 includes back-pointers 164 and 166.

A back-pointer includes a reference (e.g., site and inode#) to the parent directory and the name and generation number of the corresponding link. The generation number is a number that uniquely identifies a specific name to object binding. Because the generation numbers are unique, correct execution semantics can be guaranteed when operations are replayed in the case of failures. Back-pointers are used in maintaining consistency of the namespace in the event of conflicting operation execution and/or operation recovery. In one embodiment, back-pointers are implemented as part of the i-node structure. Alternatively, the back-pointers are implemented as separate files.

Figure 3:
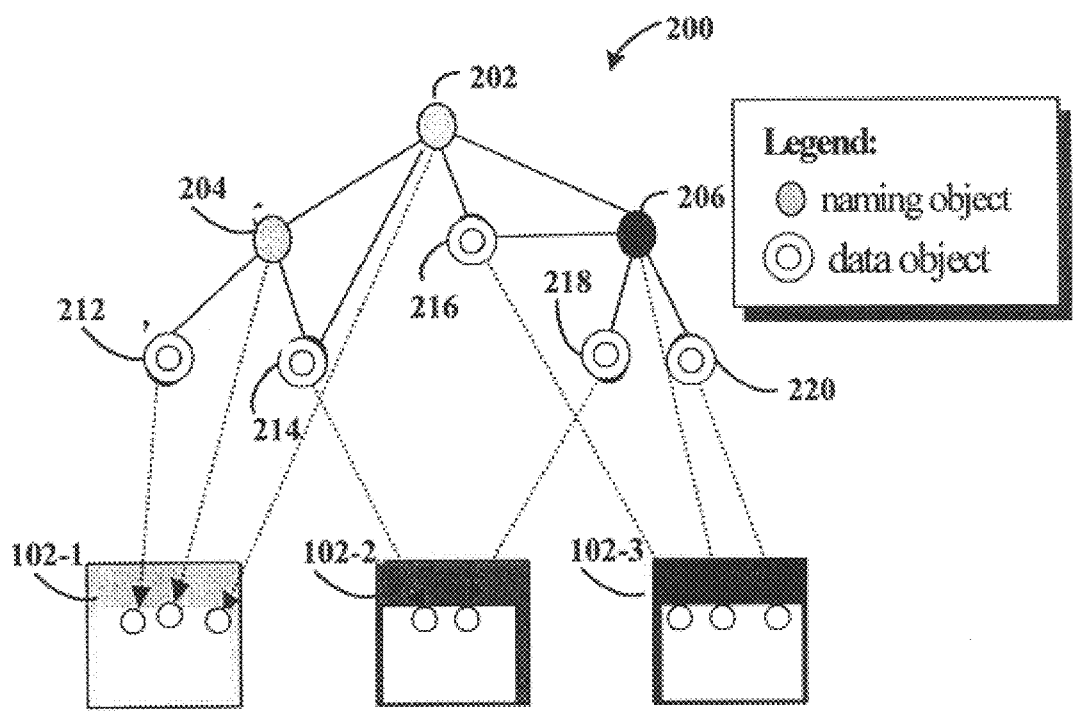
FIG. 3 is a graph that illustrates the logical relationships between objects in an example namespace.

FIG. 3 is a graph that illustrates the logical relationships between objects in an example namespace. Namespace 200 is a hierarchical name-space, where every node (object) is referenced by one or more other nodes in the hierarchy. Intermediate nodes 202, 204, and 206 in the hierarchy are special naming objects, and the leaf nodes 212, 214, 216, 218, and 220 are data objects. The naming objects and data objects can reside in any one of a number of possible partition servers 102-1, 102-3, 102-3. The dashed, directional lines illustrate the association of the respective data objects with the partition servers in which the objects are stored.

The execution of the link and unlink operations is initiated by a client that invokes a request to the partition server where the affected directory resides ("namespace site"). The requests include parameters that are required for the execution of the corresponding protocols, as shown in Table 2 below.

TABLE 2

| link(P,N,O) | P: the parent directory's reference: <site, inode#> (site is the namespace site where the request is sent). |
|---|---|
| unlink(P,N) | N: the name assigned to the object (string). |
| | O: the object's reference: <site, inode#>. |

Elsewhere in this discussion, the objects operated upon by a namespace operation will be referred to as the namespace object and the target object. Relative to the link and unlink operations described in Table 2, the namespace object is the parent directory (P), and the target object is the object identified by the operation (N).

Figure 4:
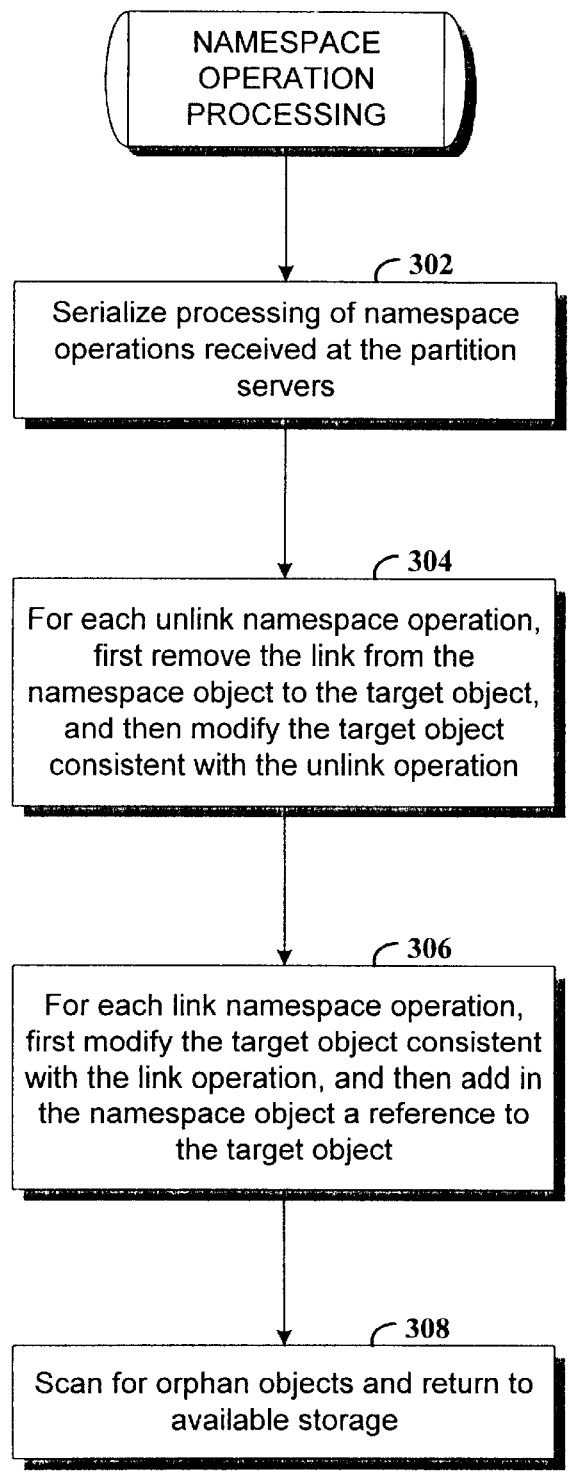
FIG. 4 is a flowchart of a process for performing namespace operations in accordance with one embodiment of the invention.

FIG. 4 is a flowchart of a process for performing namespace operations in accordance with one embodiment of the invention. By imposing a certain order on the execution of namespace operations, all possible inconsistencies in the namespace (i.e., inconsistencies introduced by interrupted operations) are reduced to instances of "orphan" objects. An orphan object is an object that physically exists in the system, but is not referenced by any object/name in the namespace. The required execution order for link and unlink operations can be generalized as:

1. Remove the reference from the namespace object, if necessary.
2. perform any needed changes on the target object.
3. Insert a reference in the namespace object, if necessary.

The above generalized process applies to every distributed namespace operation. In terms of the link and unlink primitives, the generalized process can be more particularly stated as follows:

link: add the reference to the namespace at the last stage of the execution.

unlink: remove the reference from the namespace is the very first stage of the execution.

For either operation, the only possible inconsistency in the event of a failure is a target object that is not referenced by any naming object in the namespace. Handling orphan objects is easier than handling invalid references.

At step 302, each of the partition servers serializes namespace operations as operations are received. That is, each partition server processes one namespace operation at a time. Even though the serialization may have some negative impact on concurrency of operations, serialization eliminates locking of the global namespace and thereby provides concurrency across the partition servers.

Step 304 describes the processing of an unlink namespace operation, which is based on the generalized steps identified above. In the namespace object referenced by the unlink operation, the link to the target object is first removed. The target object is then modified in accordance with the unlink operation. In the target object, the back-pointer is removed. If the target object then contains no more back-pointers, the space occupied by the target object is returned to a pool of available storage.

Step 306 describes the processing of a link namespace operation. In a link operation, the target object is first modified to point to the namespace object. Then the namespace object is updated to point to the target object.

By ordering the steps of the link and unlink operations as just described, the namespace hierarchy will remain consistent, even in the event of a system or communications failure. However, an unexpected interruption during the processing of a namespace operation may result in orphan objects in the namespace. At step 308, the process scans the namespace for objects having no back-pointers. The orphan objects are returned to the pool of available storage. In one embodiment, the scan is performed automatically at prescribed intervals. In another embodiment, the scan is initiated by an administrator.

A log file is used while performing namespace operations in support of recoverability in the event of a system or communications failure. Log records are written to the log file to record various data that describe the operations in process. The structure of a log record is shown in Table 3. The fields refer to the name of the object binding that is to be created or removed, in the case of link and unlink respectively. The creation and reclamation of a log record mark the beginning and the end of the execution of a namespace operation. An open log record implies that the operation has not been completed. The contents of the log record(s) are used in the process of recovering from a system or communication failure.

TABLE 3

| Operation type (link/unlink) | namespace object (directory) ref site inode# | object name | object reference site inode# | generation# |
|---|---|---|---|---|

There are two sites involved in the execution of link and unlink operations: the namespace site, where the referencing directory ("namespace object") resides; and the object site, where the referenced object ("target object") resides. Depending on the system implementation, these two sites may be remote from one another, and the protocol execution involves message transmission between the two sites. Table 4 provides a legend for the message diagrams of FIGS. 5–8, which further describe protocol execution. In order to keep the discussion simple, all disk operations other than log accesses are assumed to be synchronous.

TABLE 4

| [act] | An atomic operation on stable storage. |
|---|---|
| → | A communication message across sites. |
| Xn | A potential failure position. A failure at this point may affect anything after the immediately preceding atomic action. |
| [Log+/−]$_{S/A}$ | Creation (or update)/reclamation of a log record; synchronous (force write) or asynchronous (lazy), respectively. |
| D+/− | Creation/removal of a <name, reference> pair (directory entry). |
| Bptr+/− | Creation/removal of a back pointer. |

Figure 5:
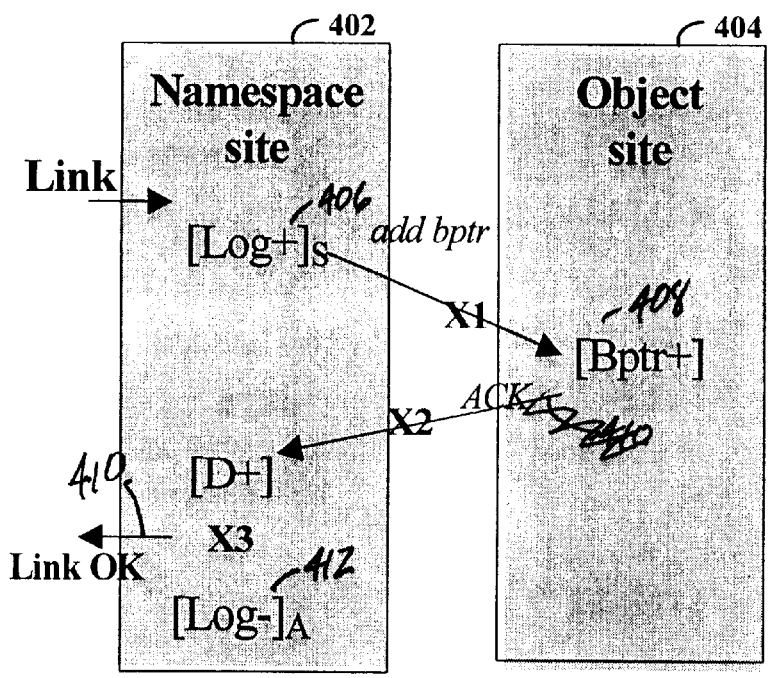
FIG. 5 illustrates a protocol for performing a link namespace operation in accordance with one embodiment of the invention.

FIG. 5 illustrates the protocol for performing a link namespace operation in accordance with one embodiment of the invention. Block 402 contains operations performed at the namespace site, and block 404 contains operations performed at the object site. The directional lines represent messages transferred between the client, namespace site, and object site. The execution is initiated in response to a request from a client. The first step is the synchronous creation of a log record (406) in the namespace site. The synchronous creation means that the link operation does not progress until the log record is written to retentive storage. The link operation requires one message round trip between the namespace and object sites and two synchronous accesses to storage, one on the object site to add the back pointer and one on the namespace site to create the directory entry. The "add bptr" message carries information that is used to create the back pointer (408) on the object site. The link operation requires two accesses to the log for the creation and reclamation of the log record. Since the reclamation of the log record is asynchronous, a reply is sent (410) to the client as soon as the directory entry is added, rather than waiting for the log record to be reclaimed (412).

The pseudocode below sets forth additional details for an example implementation of the link operation. The particular structure of the code is further explained below in relation to recovering namespace operations.

```
Namespace site:
    Link (P,N,O) {
        if dir-entry D does not exist then
            r := {"link",P,O,N,new_gen#( ));
            Log+_s(r);
            Link_body(r);
        else
            Reply to client (error);
    }
    Link_body(r) {
        info := r;
        send "add bptr"+ info to Obj site;
        Wait until reply received or Timeout;
        if reply=ACK then
            if D does not exist then
                D+;
                reply to client (success);
                Log-_A(r);
            else /* LL(1) */
                unlink execute; //as in unlink op
                Log-_A(r);
                reply to client (error);
        else if reply=NACK then
            reply to client (error);
            Log-_A(r);
    }
Object site:
    Add_back-pointer(info) {
        if back-pointer exists
            (compare info vs. back-pointer) then
            if same generation# then /* LL(2) */
                send ACK back to namespace;
            else /* LL(3) */
                send NACK back to namespace site;
        else
            Bptr+;
            Send ACK back to namespace;
    }
```

Figure 6:
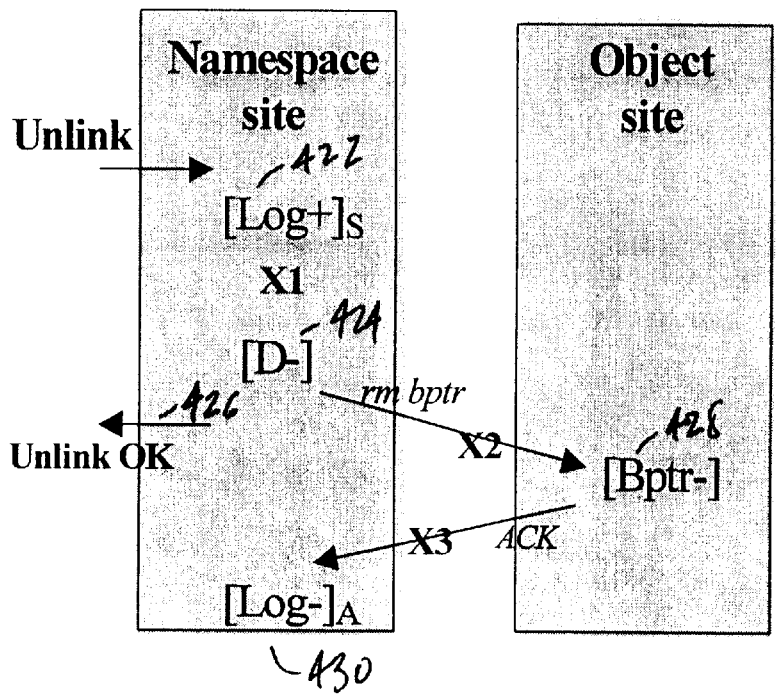
FIG. 6 illustrates a protocol for performing an unlink namespace operation in accordance with one embodiment of the invention.

FIG. 6 illustrates the protocol for performing an unlink namespace operation in accordance with one embodiment of the invention. The first step performed at the namespace site in response to an unlink request is to synchronously create a log record (422) that describes the unlink request. The log record that is synchronously created on the namespace site contains all the necessary information for recovery in the case of failure during the unlink operation. The next step is to remove the reference (424) to the target object from the namespace object at the namespace site. The namespace site replies (426) to the client as soon as the reference has been removed from the namespace object. Since the orphan recovery process reclaims orphan objects at the object site, the client process can proceed as soon as the reference has been removed from the namespace object at the namespace site.

The unlink operation requires one message roundtrip: the request to the object site to remove the backpointer (428) and the response from the object site. The operation requires two accesses to the log, with the creation of the log record being synchronous, and reclaiming (430) the log record being asynchronous.

The pseudocode below sets forth additional details for an example implementation of the unlink operation. The particular structure of the code is further explained below in relation to recovering namespace operations.

```
Namespace site:
    Unlink(P,N) {
        if dir-entry D does exist then
            r := {"unlink",P,D.O,N,D.gen#);
            Log+_s(r);
            D-;
            Reply to client (success);
            Unlink_body(r);
        else
            Reply to client (error);
    }
    Unlink_body(r) {
        info := r;
        Send "remove-bptr"+info to Obj site;
        Wait until reply received or Timeout;
        if reply received (ACK or NACK) then
            Log-_A(r);
    }
Object site:
    Remove_back-pointer(info) {
        if back-pointer does not exist
                /* UL(1) */
            (info not equal to bptr) then
                send NACK to namespace site;
        else
            Bptr-;
            Send ACK to namespace;
    }
```

Recovery techniques for traditional transactional protocols are generally either classified as conservative or aggressive. Relative to the present invention, conservative recovery implies that the partial results of the original operation execution are undone at both the namespace and object sites. In a worst-case scenario, conservative recovery unrolls the results of an operation that was successful except for the reclamation of the log record. With aggressive recovery, the aim is to complete a partially performed operation and bring the namespace and object sites to mutually consistent states, relative to the operation.

The recovery processes described herein may be classified as aggressive. In recovering from either a system or communication failure the log at the namespace site is traversed for records that indicate incomplete operations. The recovery processes assume that the presence of a log record in the log file means that the associated operation did not complete, even though the operation may have been completed and the system failed prior to removal of the log record. Generally, incomplete operations are re-executed without creating a new log record. In the case of a link operation a new generation number is not generated. This makes re-execution of the operation and the corresponding messages indistinguishable from operations that are not being recovered.

Recovery is initiated by the namespace site, in either of two ways (as illustrated in the pseudocode below): 1) when the communication with a specific host (where object-site operations are pending) timeouts; implemented by routine "on_timeout_for_record(r)"; or 2) when the namespace site recovers from a crash; implemented by routine "total_recovery".

```
on_timeout_for_record (r) {
    replay_link/unlink (r);
}
total_recovery {
    for all records r in log do
        replay_link/unlink (r);
}
```

There are three possible points where the execution of the link operation may be interrupted due to failures, as shown in FIG. 5:
1. X1—only the log record has been created, the back pointer has not been added, and no subsequent link step has been executed.
2. X2—the back pointer is added, but the namespace has not been updated.
3. X3—both the object and namespace have been updated, but the log record has not been reclaimed.

The pseudocode below describes the recovery protocol for a link operation. The "if" clause distinguishes failures that occur at point X3 from failures at X1 or X2. In the latter case, the main body of the link operation. ("Link_body(r)" is re-executed, without creating a new log record. If the failure occurred at point X3 ("else" clause), the recovery process reclaims the log record of the original execution; the rest of the operation has been completed.

```
replay_link (r) {
    if dir-entry D does not exist then
        Link_body (r);
        // same as in the failure-free case
    else
        Log-_A;
}
```

If objects were annotated with traditional link-count attributes, the above procedure would risk unnecessarily incrementing the link-count of the target object. The use of back pointers, which uniquely reference parent directories and the operation that created the link, provides that link operations can be safely re-executed in the event of failures. Even if failures occur during the recovery process, the recovery process can be re-initiated without risk of having created inconsistencies at either the object or the namespace site.

There are three possible points where the execution of the unlink operation may be interrupted, as shown in FIG. 6:
1. X1—the log is created but no other step has been performed.
2. X2—the namespace is updated, but the back pointer has not been removed at the object site.
3. X3—both the namespace and the object site (back pointer) have been updated, but the log record has not been reclaimed.

The pseudocode below describes the recovery protocol for an unlink operation. The "if" clause distinguishes failures that occur at point X1 from failures at X2 or X3. In the latter case, the main body of the unlink operation ("Unlink_body(r)" set forth above in the pseudocode in connection with FIG. 6) is re-executed without creating a new log record. If the failure occurred at point X1, then only the log record is reclaimed. The use of back pointers provides that unlink operations and the recovery protocol can be safely re-executed in the event of failures without risking inconsistencies in the system.

```
replay_unlink (r) {
    if dir-entry D exists && gener# matches then
        D-;
        reply to client (success);
        Unlink_body (r);
        // same as in the failure-free case
        Log-_A;
}
```

The protocols described herein seek to maximize concurrency in performing namespace operations. The present invention does not lock resources across the sites involved in a namespace operation, in contrast to transaction-type protocols. However, issues of conflicting operations in the system must be addressed. As between two link operations, there are two potential conflicts: 1) link operations that refer to the same name entry and to the same object; and 2) link operations that refer to the same name entry but to different objects. For link operations that refer to the same name entry and same object, the first operation to successfully set the back pointer is the one that eventually succeeds, even if recovery takes place and either of the link operations is re-executed. When a link operation is executed at the object site and a back pointer for the referenced name entry already exists, one of two situations is possible:

1. The generation# in the back pointer matches the generation# in the payload of the "add bptr" message (commented as LL(2) in the pseudocode for the object site for a link operation). This implies that this operation has already been completed successfully at the object site. An ACK is returned to the namespace site.
2. The two generation#'s do not match. A NACK is returned indicating that the back pointer has been already added by another link operation (commented as LL(3) in the pseudocode for the object site for a link operation).

In situation 2, success depends on which operation enters the namespace object first. Note, that the referenced objects may reside in different partition servers, and therefore, the delivery order of the ACKs associated with the the conflicting link operations cannot be predicted. Upon return of an ACK for a link operation, the namespace is checked again for the corresponding namespace object. If the namespace object already exists (for example, inserted by another link operation and referencing another target object), the link operation fails and the results must be undone at the object site. The functionality of the unlink operation is re-used for this purpose (commented as LL(1) in the psuedocode for the namespace site for a link operation).

As between two unlink operations, the only potential conflict occurs when the operations refer to the same namespace object. Irrespective of the possible scenarios in which the steps of the unlink operations may be interleaved, only one operation succeeds in removing the namespace object. Thus, this class of conflicts is resolved by serialization of operations at the namespace site.

Conflicts between link and unlink operations are not an issue in the absence of failures because the operations are serialized at the namespace site. However, when a failure results in incomplete execution of operations, there are two cases of conflicts to be considered. The first case occurs when a link operation fails at point X3 (see FIGS. 5 and 7), and before recovery is initiated an unlink operation is started for the same namespace object. The second case occurs when an unlink operation fails at points X2 or X3 (see FIGS. 6 and 8), and before recovery is initiated a link operation is started for the same namespace and target objects.

Figure 7:
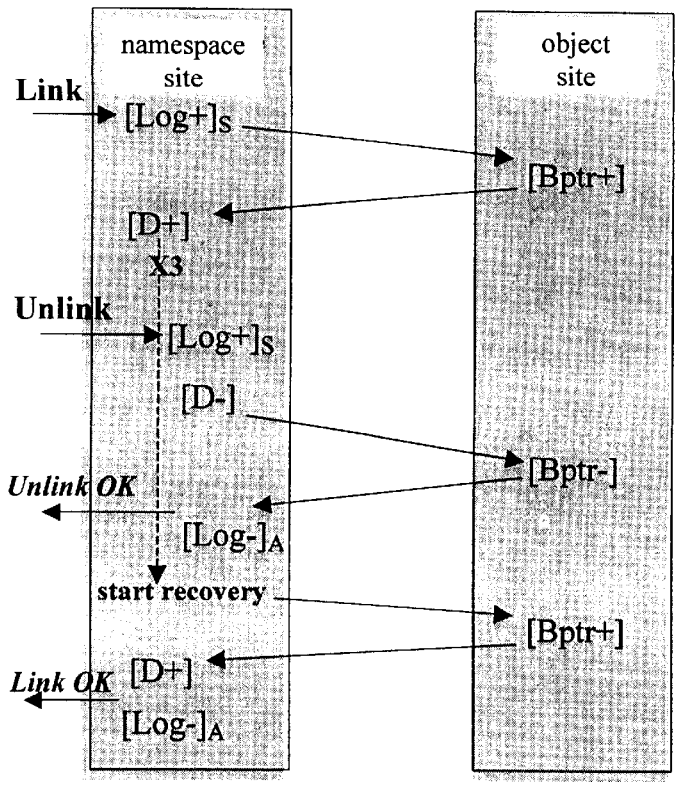
FIG. 7 illustrates a link-unlink conflict scenario where a failure occurs during execution of a link operation, and before recovery is initiated an unlink operation is started for the same namespace object.

FIG. 7 illustrates a link-unlink conflict scenario where a failure occurs during execution of a link operation, and before recovery is initiated an unlink operation is started for the same namespace object. The failure occurs at X3. The recovery of the link operation is initiated after the successful completion of the unlink operation. Re-execution of the link operation causes a back pointer to be added at the target object and creation of a namespace object. Eventually, the namespace is consistent, but overall this scenario may present unacceptable semantics for the clients since had the link-unlink sequence completed without interruption from a system failure, the target object would not be linked to the namespace object.

Such scenarios can occur only in the presence of a system failure of the namespace site. To address these scenarios, the namespace site does not process any new operations following recovery from a system failure until all incomplete operations in the log file are re-started (not necessarily completed). In the example of FIG. 7, the unlink operation is not initiated until the link operation identified in the log file has been re-started.

Figure 8:
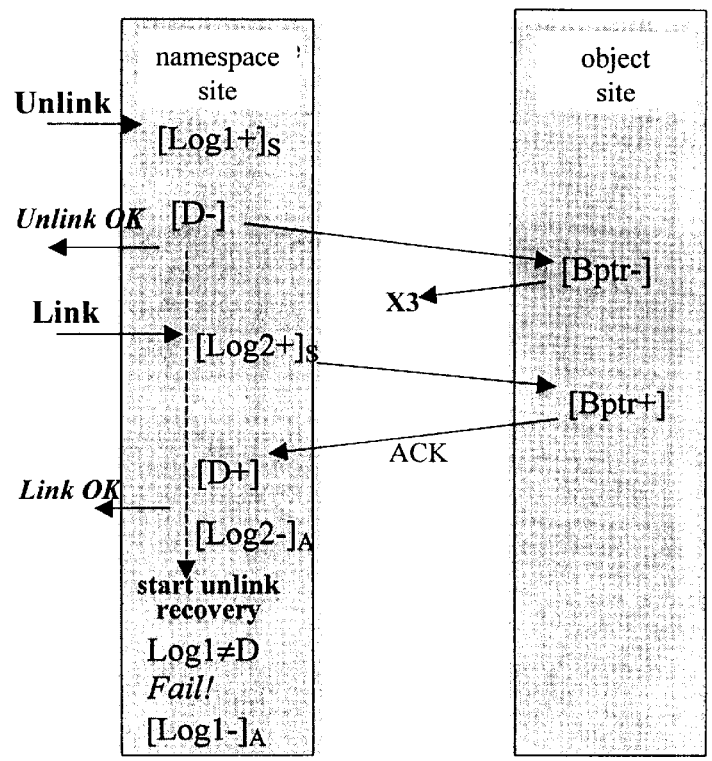
FIG. 8 illustrates an unlink-link conflict scenario where a failure occurs during execution of an unlink operation, and before recovery is initiated a link operation is started for the same namespace and target objects.

FIG. 8 illustrates an unlink-link conflict scenario where a failure occurs during execution of an unlink operation, and before recovery is initiated a link operation is started for the same namespace and target objects. The failure occurs at point X3 (or in another scenario at X2 as shown in FIG. 6). Failures at X2 or X3 may be caused by a failure in communications between the namespace site and the object site. Thus, the recovery protocol described in association with FIG. 7 is not helpful in this conflict scenario.

In the illustrated conflict scenario, after the unlink operation is partially completed the link operation successfully adds a new back pointer at the target object site and creates a namespace object at the namespace site. The recovery procedure for the unlink operation is initiated after completion of the link operation. If in recovering the unlink operation only the namespace object name is used to identify the namespace object to unlink, the unlink operation removes the link just created by the link operation. This state may be unacceptable since, in the absence of a failure, after completing the unlink and link operations the namespace object would be linked to the target object.

To address this conflict, the unlink operation compares all fields of the unlink log record to fields of the existing namespace object. If any of the fields do not match, the recovery of the unlink operation is aborted and the log record is reclaimed.

The present invention is believed to be applicable to a variety of data storage management systems and has been found to be particularly applicable and beneficial in distributed file systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for performing namespace operations in a distributed file system disposed on a plurality of partition servers, each partition server controlling access to a subset of shared storage objects in the distributed file system, wherein the shared storage objects are hierarchically related, and each namespace operation involves a namespace object and a target object that are part of the shared storage objects, comprising:

serializing namespace operations received at each partition server;

performing steps (a)–(d) in response to a link namespace operation;

(a) writing a link log record that describes the link operation to a log file in retentive storage;

(b) modifying the target object consistent with the link namespace operation after the writing step;

(c) after the modifying step inserting a reference in the namespace object to the target object; and (d) deleting the link log record after the inserting step;

performing steps (e)–(h) in response to an unlink namespace operation;

(e) writing an unlink log record that describes the unlink operation to the log file in retentive storage;

(f) removing a reference in the namespace object to the target object after writing the log record;

(g) after the removing step, modifying the target object consistent with the unlink namespace operation; and (h) deleting the unlink log record after the modifying step (g).

2. The method of claim 1, further comprising sending to a requester an acknowledgment that indicates completion of the link operation after the inserting step and before deleting the link log record.

3. The method of claim 2, further comprising sending to a requester an acknowledgment that indicates completion of the unlink operation after the removing step and without waiting for completion of the modifying step (g).

4. The method of claim 1, further comprising sending to a requester an acknowledgment that indicates completion of the unlink operation after the removing step and without waiting for completion of the modifying step (g).

5. The method of claim 1, wherein a namespace site is the partition server on which the namespace object is stored, and the target site is the partition server on which the target object is stored, the method further comprising, in response to a recovery condition detected at the namespace site, for each link log record in the log file:

if a namespace object referenced by the link log record is present on the namespace site, then deleting the link log record; and if a namespace object referenced by the link log record is not present on the namespace site, then performing steps (b) through (d) for the namespace object and target object referenced in the link log record.

6. The method of claim 5, further comprising for each unlink log record in the log file:

if a namespace object referenced by the unlink log record is present on the namespace site, then performing steps (f) through (g); and if a namespace object referenced by the unlink log record is not present on the namespace site, then performing step (g).

7. The method of claim 6, further comprising, in recovering namespace operations in the log file in response to a failure that requires rebooting the namespace site, performing recovery on all namespace operations in the log file before processing newly received namespace operations.

8. The method of claim 6, further comprising:

storing unique link generation numbers in association with references from namespace objects to target objects, respectively;

storing in an unlink log record the link generation number associated with the namespace object and target object specified in the unlink operation; and in recovering an unlink namespace operation from the log file, removing a reference from a namespace object to a target object as specified in an unlink log record only if the link generation number in the unlink log record matches the link generation number in the namespace object.

9. The method of claim 6, further comprising sending to a requester an acknowledgment that indicates completion of the link operation after the inserting step and before deleting the link log record.

10. The method of claim 6, further comprising sending to a requester an acknowledgment that indicates completion of the unlink operation after the removing step and without waiting for completion of the modifying step (g).

* * * * *